US012626230B1

(12) United States Patent
Cohen et al.

(10) Patent No.: US 12,626,230 B1
(45) Date of Patent: May 12, 2026

(54) VEHICLE STATUS ANALYSIS MECHANISM

(71) Applicant: UVeye Ltd., Tel Aviv (IL)

(72) Inventors: Idan Cohen, Tel Aviv (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/346,612

(22) Filed: Oct. 1, 2025

(51) Int. Cl.
| | |
|---|---|
| *G06Q 10/20* | (2023.01) |
| *G06F 3/0482* | (2013.01) |
| *G07C 5/12* | (2006.01) |

(52) U.S. Cl.
CPC ........... *G06Q 10/20* (2013.01); *G06F 3/0482* (2013.01); *G07C 5/12* (2013.01)

(58) Field of Classification Search
CPC ....... G06Q 10/20; G06Q 40/08; G06F 3/0482
See application file for complete search history.

(56) References Cited

U.S. PATENT DOCUMENTS

| | | | |
|---|---|---|---|
| 10,360,601 | B1 | 7/2019 | Adegan |
| 10,706,321 | B1 | 7/2020 | Chen et al. |
| 10,791,265 | B1 | 9/2020 | Lambert et al. |
| 10,922,726 | B1 | 2/2021 | Nelson et al. |
| 11,443,288 | B2 | 9/2022 | Taliwal et al. |
| 11,935,118 | B2 | 3/2024 | Ushman et al. |
| 12,020,217 | B2 | 6/2024 | Gandhi et al. |
| 12,249,061 | B1 | 3/2025 | Segal et al. |
| 2017/0357618 | A1* | 12/2017 | Hamblin ............... G07C 5/008 |
| 2018/0174221 | A1 | 6/2018 | Merg et al. |

(Continued)

FOREIGN PATENT DOCUMENTS

| | | | |
|---|---|---|---|
| CA | 3149981 | 3/2021 | |
| EP | 3255602 A1 * | 12/2017 | ............. B64D 45/00 |

(Continued)

OTHER PUBLICATIONS

Suriyapathiraja et al "Car Body Damage Detection and Cost Estimation Based on Generative AI" 2025 Moratuwa Engineering Research Conference (2025) (Year: 2025).*

(Continued)

*Primary Examiner* — Andrew Chase Lakhani

(57) ABSTRACT

There is provided a system for generating instructions for a generative model to present vehicle damage assessment. The system includes image sensors positioned at different heights and angles to capture vehicle images, a communication element for receiving images and accessing a stored model, and a processor connected to endpoint devices via a network. The processor generates instructional inputs combining damage severity classifications with vehicle images, sends these to the generative model, and obtains natural language elements for structural damage reconstitution. The system creates interactive presentations with populated template fields and classification selection elements displayed on endpoint devices. When users select different damage severity classifications in real-time, the system automatically generates new instructional inputs, obtains updated natural language elements from the generative model, and dynamically updates the presentation by replacing template (Continued)

fields. This enables real-time comparison of different damage severity assessments for the same vehicle damage using the same source images.

17 Claims, 5 Drawing Sheets

(56) References Cited

U.S. PATENT DOCUMENTS

| | | | |
|---|---|---|---|
| 2020/0104805 A1 | 4/2020 | Gulati et al. | |
| 2020/0111170 A1 | 4/2020 | Oldham | |
| 2020/0234515 A1 | 7/2020 | Gronsbell et al. | |
| 2021/0142464 A1* | 5/2021 | Tian | G06T 7/0004 |
| 2021/0224975 A1 | 7/2021 | Ranca et al. | |
| 2023/0230172 A1 | 7/2023 | Pyle | |
| 2023/0281722 A1 | 9/2023 | Westhues et al. | |
| 2023/0289744 A1 | 9/2023 | Johnson | |
| 2023/0376847 A1* | 11/2023 | Travalini | G06N 3/088 |
| 2024/0086734 A1* | 3/2024 | Singh | G06N 5/022 |
| 2024/0346611 A1* | 10/2024 | Brown | G06Q 10/20 |
| 2025/0022028 A1* | 1/2025 | Sipe, III | G06Q 30/0631 |
| 2025/0085120 A1 | 3/2025 | Konrardy et al. | |

FOREIGN PATENT DOCUMENTS

| | | |
|---|---|---|
| EP | 4502917 | 2/2025 |
| WO | WO 2019/097245 | 5/2019 |
| WO | WO 2020/077449 | 4/2020 |
| WO | WO 2020/154528 | 7/2020 |

OTHER PUBLICATIONS

Interview Summary Dated Jun. 18, 2025 from the US Patent and Trademark Office Re. U.S. Appl. No. 18/944,108. (19 pages).

Official Action Dated Apr. 4, 2025 from the US Patent and Trademark Office Re. U.S. Appl. No. 18/944,108. (36 pages).

Official Action Dated Jan. 17, 2025 from the US Patent and Trademark Office Re. U.S. Appl. No. 18/944,108. (28 pages).

Ahaggach et al. "CarDPR—An Advanced Tool for Price Prediction from Unstructured Damage Reports", CEUR Workshop Proceedings, pp. 1-2, 2023 (Abstract).

Anonymous "Systems and Methods for Using Machine Learning for Vehicle Damage Detection and Repair Cost Estimation", Targeted News Service, pp. 1-2, Jun. 25, 2024 (Abstract).

Jameel et al. "Automation of Leasing Vehicle Return Assesment Using DeepLearning Models", Machine Learning and Knowledge Discovery in Databases: Applied Data Science Track, pp. 1-2, 2021 (Abstract).

Katreddi Development of Machine Learning Based Approach to Predict Fuel Consumption and Maintenance Cost of Heavy-Duty Vehicles Using Diesel and Alternative Fuels, West Virginia University ProQuest Dissertations & Theses, 2023. 30561051. DOI:10.33915/etd.11780, pp. 1-133, 2023.

* cited by examiner

100

VEHICLE STATUS ANALYSIS MECHANISM

BACKGROUND

The present invention, in some embodiments thereof, relates to graphical user interfaces and, more specifically, but not exclusively, to graphical user interfaces related to damage to a vehicle.

Prior to repair damage to a vehicle, the damage is inspected by a professional, for example, a mechanic and/or appraiser. An estimate of the cost of damage is provided. The damage is repaired when the cost of damage is approved.

SUMMARY

According to a first aspect, a computer implemented method of generating a graphical user interface (GUI) presenting damage to a vehicle, comprising: for a plurality of media elements indicating damage to the vehicle: feeding into a generative model, a prompt relating to a combination of each one of a plurality of classification categories and the plurality of media elements indicating the damage, wherein the plurality of classification categories denote increasing levels of severity of damage to the vehicle, obtaining from the generative model, a plurality of sets of a plurality of human-readable text elements corresponding to the plurality of classification categories, each respective set of human-readable text elements associated with a respective estimate for repairing the damage corresponding to the respective classification category, generating a plurality of states of the GUI, each state of the GUI presenting a respective set of human-readable text elements and at least one interactive graphical element for selecting one of the plurality of classification categories, wherein the plurality of states of the GUI corresponding to the plurality of classification categories are for a same set of media elements indicating a same damage to a same vehicle, presenting the GUI on a display, and in response to a selection of a first classification category of the plurality of classification categories via the at least one interactive graphical element of the GUI, presenting a first state of the GUI corresponding to the first classification category.

According to a second aspect, a system for generating a graphical user interface (GUI) presenting damage to a vehicle, comprising: at least one processor executing a code for: for a plurality of media elements indicating damage to the vehicle: feeding into a generative model, a prompt relating to a combination of each one of a plurality of classification categories and the plurality of media elements indicating the damage, wherein the plurality of classification categories denote increasing levels of severity of damage to the vehicle, obtaining from the generative model, a plurality of sets of a plurality of human-readable text elements corresponding to the plurality of classification categories, each respective set of human-readable text elements associated with a respective estimate for repairing the damage corresponding to the respective classification category, generating a plurality of states of the GUI, each state of the GUI presenting a respective set of human-readable text elements and at least one interactive graphical element for selecting one of the plurality of classification categories, wherein the plurality of states of the GUI corresponding to the plurality of classification categories are for a same set of media elements indicating a same damage to a same vehicle, presenting the GUI on a display, and in response to a selection of a first classification category of the plurality of classification categories via the at least one interactive graphical element of the GUI, presenting a first state of the GUI corresponding to the first classification category.

According to a third aspect, a non-transitory medium storing program instructions for generating a graphical user interface (GUI) presenting damage to a vehicle, which when executed by at least one processor, cause the at least one processor to: for a plurality of media elements indicating damage to the vehicle: feed into a generative model, a prompt relating to a combination of each one of a plurality of classification categories and the plurality of media elements indicating the damage, wherein the plurality of classification categories denote increasing levels of severity of damage to the vehicle, obtain from the generative model, a plurality of sets of a plurality of human-readable text elements corresponding to the plurality of classification categories, each respective set of human-readable text elements associated with a respective estimate for repairing the damage corresponding to the respective classification category, generate a plurality of states of the GUI, each state of the GUI presenting a respective set of human-readable text elements and at least one interactive graphical element for selecting one of the plurality of classification categories, wherein the plurality of states of the GUI corresponding to the plurality of classification categories are for a same set of media elements indicating a same damage to a same vehicle, presenting the GUI on a display, and in response to a selection of a first classification category of the plurality of classification categories via the at least one interactive graphical element of the GUI, present a first state of the GUI corresponding to the first classification category.

In a further implementation form of the first, second, and third aspects, further comprising: receiving a selection of a second classification category from the plurality of classification categories, the second classification category is different from the first classification category, and updating the GUI for presenting a second state of the GUI depicting a second set of the plurality of human-readable text elements and a second estimated cost corresponding to the second classification category.

In a further implementation form of the first, second, and third aspects, following generation of a first state of the GUI, the prompt fed into the generative model for generation of a second state of the GUI further includes an indication of the first state of the GUI generated for the first classification category.

In a further implementation form of the first, second, and third aspects, the prompt fed into the generative model requests to generate the second set for the second classification category given that the first set was previously generated for the first classification category.

In a further implementation form of the first, second, and third aspects, the generation of a certain state of the plurality of states of the GUI is performed dynamically in real time in response to selection of a certain classification category of the plurality of classification categories corresponding to the certain state.

In a further implementation form of the first, second, and third aspects, the plurality of states of the GUI are created prior to presentation of the GUI on the display.

In a further implementation form of the first, second, and third aspects, the generative model is trained on a plurality of records, wherein a record is for a sample vehicle with sample damage which has been repaired, the record includes a certain classification category from the plurality of classification categories, the plurality of media elements for the sample vehicle indicating the sample damage, and a ground truth including the set of the plurality of human-readable text elements obtained after the damage has been repaired and a total cost for performing the repair.

In a further implementation form of the first, second, and third aspects, the generative model generates a range indicating an estimated cost for repairing the damage corresponding to a respective classification category, the range corresponding to the set of the plurality of human-readable text elements corresponding to the respective classification category.

In a further implementation form of the first, second, and third aspects, further comprising: in response to interaction of a user with an interactive graphical element of the GUI indicating a value within the range of the estimate cost for repairing the damage, feeding into the generative model a prompt indicating the value within the range and a request to update the set of the plurality of human-readable text elements of the presented GUI state to comply with the value, obtaining an update of the set, and updating the GUI for presenting the update of the set.

In a further implementation form of the first, second, and third aspects, further comprising: in response to interaction of a user with an interactive graphical element of the GUI indicating a value within the range of the estimate cost for repairing the damage, adapting at least one of the following human-readable text elements of the set of the state of the GUI presented on the display: (i) at least one material used for repairing the damage, (ii) at least one step in a repair process for repairing the damage, (iii) labor for repairing the damage, (iv) projected quality of the repair of the damage, wherein an adapted set including the adapted at least one human-readable text element complies with the value within the range, wherein the GUI is updated for presenting the adapted at least one human-readable text element.

In a further implementation form of the first, second, and third aspects, the GUI further includes an adaptable interactive graphical element indicating an estimated cost for repairing the damage, and further comprising: automatically adapting the interactive graphical element for indicating the estimate for repairing the damage generated by the generative model.

In a further implementation form of the first, second, and third aspects, further comprising: receiving via the GUI, a value or range representing the estimated cost for repairing the damage, the value or range obtained in response to a user interacting with an interactive graphical element presented within the GUI, feeding a prompt into the generative model indicating the value or range, wherein the set obtained from the generative model corresponds to the value or range, wherein the estimate for repairing the damage presented within the GUI includes the value or range.

In a further implementation form of the first, second, and third aspects, the plurality of human-readable text elements include a plurality of ranges for a plurality of values representing a breakdown of the estimate for repair of the damage, and at least one of: the estimate is computed according to the plurality of range, and a range of the estimate is narrowed in response to selection of a specific value within a range.

In a further implementation form of the first, second, and third aspects, the plurality of media elements indicating the damage are selected from: at least one image of a region of the vehicle including the damage captured by at least one camera, and a human-readable text description of the damage.

In a further implementation form of the first, second, and third aspects, the plurality of human-readable text elements are selected from: steps in a repair process, cost per part, cost of labor, cost of materials, miscellaneous costs, and safety considerations.

In a further implementation form of the first, second, and third aspects, the combination of the prompt fed into the generative model includes at least one vehicle attribute.

According to a fourth aspect, a system for dynamically generating instructional inputs for feeding into a generative model for presenting damage to a vehicle, comprises: a plurality of image sensors positioned at a plurality of different heights and/or angles relative to the vehicle configured for acquiring a plurality of images of the vehicle, a data communication element configured to receive the plurality of images of the vehicle and to access a data storage device storing the generative model, at least one processor in communication with data communication element and with at least one endpoint device over a network, the at least one processor configured for executing a code for: generating a first instructional input including first a combination of a first classification of a plurality of classifications and the plurality of images of the vehicle indicating the damage, wherein the plurality of classifications denote increasing levels of severity of damage to the vehicle, sending the first instructional input to an input communication element for input into the generative model, obtaining from the generative model, a first set of a plurality of natural language elements corresponding to the first classification, the first set of natural language elements associated with a first indication for structural reconstitution of the damage corresponding to the first classification, generating a first state of a presentation of a template with a plurality of fields populated with the first set of natural language elements and including at least one interactive element for selecting a second classification of the plurality of classifications, presenting the presentation on an endpoint device accessing the at least one processor, and in real-time, detecting a selection of a second classification of the plurality of classifications made by a user interacting with the at least one interactive element of the presentation, generating a second instructional input including a second combination of the second classification of the plurality of classifications and the plurality of images of the vehicle, sending the second instructional input to the input communication element for input into the generative model, obtaining from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle, and dynamically updating the presentation on the endpoint device for presenting the second state of the presentation by replacing the plurality of fields of the template with the second set of natural language elements.

According to a fifth aspect, a computer implemented method of dynamically generating instructional inputs for feeding into a generative model for presenting damage to a vehicle, comprises: using at least one processor executing a code for: receiving a plurality of images of the vehicle acquired by a plurality of image sensors positioned at a plurality of different heights and/or angles relative to the vehicle, accessing a data storage device storing the generative model, generating a first instructional input including first a combination of a first classification of a plurality of classifications and the plurality of images of the vehicle indicating the damage, wherein the plurality of classifications denote increasing levels of severity of damage to the vehicle, sending the first instructional input to an input communication element for input into the generative model, obtaining from the generative model, a first set of a plurality of natural language elements corresponding to the first classification, the first set of natural language elements associated with a first indication for structural reconstitution of the damage corresponding to the first classification, generating a first state of a presentation of a template with a plurality of fields populated with the first set of natural language elements and including at least one interactive element for selecting a second classification of the plurality of classifications, presenting the presentation on an endpoint device accessing the at least one processor, and in real-time, detecting a selection of a second classification of the plurality of classifications made by a user interacting with the at least one interactive element of the presentation, generating a second instructional input including a second combination of the second classification of the plurality of classifications and the plurality of images of the vehicle, sending the second instructional input to the input communication element for input into the generative model, obtaining from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle, and dynamically updating the presentation on the endpoint device for presenting the second state of the presentation by replacing the plurality of fields of the template with the second set of natural language elements.

According to a sixth aspect, a non-transitory medium storing program instructions for dynamically generating instructional inputs for feeding into a generative model for presenting damage to a vehicle, which when executed by at least one processor, cause the at least one processor to: receive a plurality of images of the vehicle acquired by a plurality of image sensors positioned at a plurality of different heights and/or angles relative to the vehicle, access a data storage device storing the generative model, generate a first instructional input including first a combination of a first classification of a plurality of classifications and the plurality of images of the vehicle indicating the damage, wherein the plurality of classifications denote increasing levels of severity of damage to the vehicle, send the first instructional input to an input communication element for input into the generative model, obtain from the generative model, a first set of a plurality of natural language elements corresponding to the first classification, the first set of natural language elements associated with a first indication for structural reconstitution of the damage corresponding to the first classification, generate a first state of a presentation of a template with a plurality of fields populated with the first set of natural language elements and including at least one interactive element for selecting a second classification of the plurality of classifications, present the presentation on an endpoint device accessing the at least one processor, and in real-time, detect a selection of a second classification of the plurality of classifications made by a user interacting with the at least one interactive element of the presentation, generate a second instructional input including a second combination of the second classification of the plurality of classifications and the plurality of images of the vehicle, send the second instructional input to the input communication element for input into the generative model, obtain from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle, and dynamically update the presentation on the endpoint device for presenting the second state of the presentation by replacing the plurality of fields of the template with the second set of natural language elements.

In a further implementation form of the fourth, fifth, and sixth aspects, further comprising code for: in real-time, detecting a selection of a third classification of the plurality of classifications made by a user interacting with the at least one interactive element of the presentation, generating a third instructional input including a third combination of the third classification of the plurality of classifications and the plurality of images of the vehicle, sending the third instructional input to the input communication element for input into the generative model, obtaining from the generative model, a third set of a plurality of natural language elements corresponding to the third classification, the third set of natural language elements associated with a third indication for structural reconstitution of the damage corresponding to the third classification, wherein the first state of the presentation corresponding to the first classification and a third state of the presentation corresponding to the third classification are for the same plurality of images of the vehicle of the same damage to the same vehicle, and dynamically updating the presentation on the endpoint device for presenting the third state of the presentation by replacing the plurality of fields of the template with the third set of natural language elements.

In a further implementation form of the fourth, fifth, and sixth aspects, the natural language elements comprise human-readable text.

In a further implementation form of the fourth, fifth, and sixth aspects, the presentation comprises a graphical user interface (GUI), wherein the at least one interactive elements comprises at least one interactive graphical element.

In a further implementation form of the fourth, fifth, and sixth aspects, further comprising code for accessing a text description of the damage, wherein the text description is included in the first combination used to generate the first instructional input and the second combination used to generate the second instructional input.

In a further implementation form of the fourth, fifth, and sixth aspects, the generative model is trained on a plurality of records, wherein a record is for a sample vehicle with sample damage which has been repaired, the record includes a certain classification from the plurality of classifications, the plurality of images for the sample vehicle depict the sample damage, and a ground truth including the set of the plurality of natural language elements obtained after the damage has been repaired and a total cost for performing the repair.

In a further implementation form of the fourth, fifth, and sixth aspects, the generative model generates a range indicating an estimated cost for structural reconstitution of the damage corresponding to a respective classification, the range corresponding to the set of the plurality of natural language elements corresponding to the respective classification, and wherein the presentation comprises a GUI.

In a further implementation form of the fourth, fifth, and sixth aspects, further comprising code for: in response to interaction of a user with an interactive element of the GUI indicating a value within the range of the estimate cost for structural reconstitution of the damage, feeding into the generative model an instructional input indicating the value within the range and a request to update the set of the plurality of natural language elements of the presented GUI state to comply with the value, obtaining an update of the set, and updating the GUI for presenting the update of the set.

In a further implementation form of the fourth, fifth, and sixth aspects, further comprising code for: in response to interaction of a user with an interactive graphical element of the GUI indicating a value within the range of the estimate cost for repairing the damage, generating an adapted at least one natural text element by adapting at least one of the following natural language elements of the set of the state of the GUI presented on the display: (i) at least one material used for structural reconstitution of the damage, (ii) at least one step in a repair process for structural reconstitution of the damage, (iii) labor for structural reconstitution of the damage, (iv) projected quality of the structural reconstitution of the damage, wherein an adapted set including the adapted at least one natural language text element complies with the value within the range, wherein the GUI is updated for presenting the adapted at least one natural language element.

In a further implementation form of the fourth, fifth, and sixth aspects, the GUI further includes an adaptable interactive graphical element indicating an estimated cost for structural reconstitution of the damage, and further comprising: automatically adapting the interactive graphical element for indicating an estimate for structural reconstitution of the damage generated by the generative model.

In a further implementation form of the fourth, fifth, and sixth aspects, further comprising code for: receiving via the GUI, a value or range representing an estimated cost for structural reconstitution of the damage, the value or range obtained in response to a user interacting with an interactive graphical element presented within the GUI, feeding an instructional input into the generative model indicating the value or range, wherein the set obtained from the generative model corresponds to the value or range, wherein the estimated cost for structural reconstitution of the damage presented within the GUI includes the value or range.

In a further implementation form of the fourth, fifth, and sixth aspects, the plurality of natural language elements include a plurality of ranges for a plurality of values representing a breakdown of an estimate for structural reconstitution of the damage, and at least one of: the estimate is computed according to the plurality of range, and a range of the estimate is narrowed in response to selection of a specific value within a range.

In a further implementation form of the fourth, fifth, and sixth aspects, the plurality of fields in the template which are populated by natural language elements are selected from: steps in a repair process, cost per part, cost of labor, cost of materials, miscellaneous costs, safety considerations.

In a further implementation form of the fourth, fifth, and sixth aspects, at least the first instructional input fed into the generative model includes at least one vehicle attribute, wherein a record of a sample vehicle used to train the generative model includes at least one vehicle attribute of the sample vehicle.

In a further implementation form of the fourth, fifth, and sixth aspects, the at least one vehicle attribute is selected from manufacturer, model, year of manufacturing, installed vehicle features, and upgrades.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
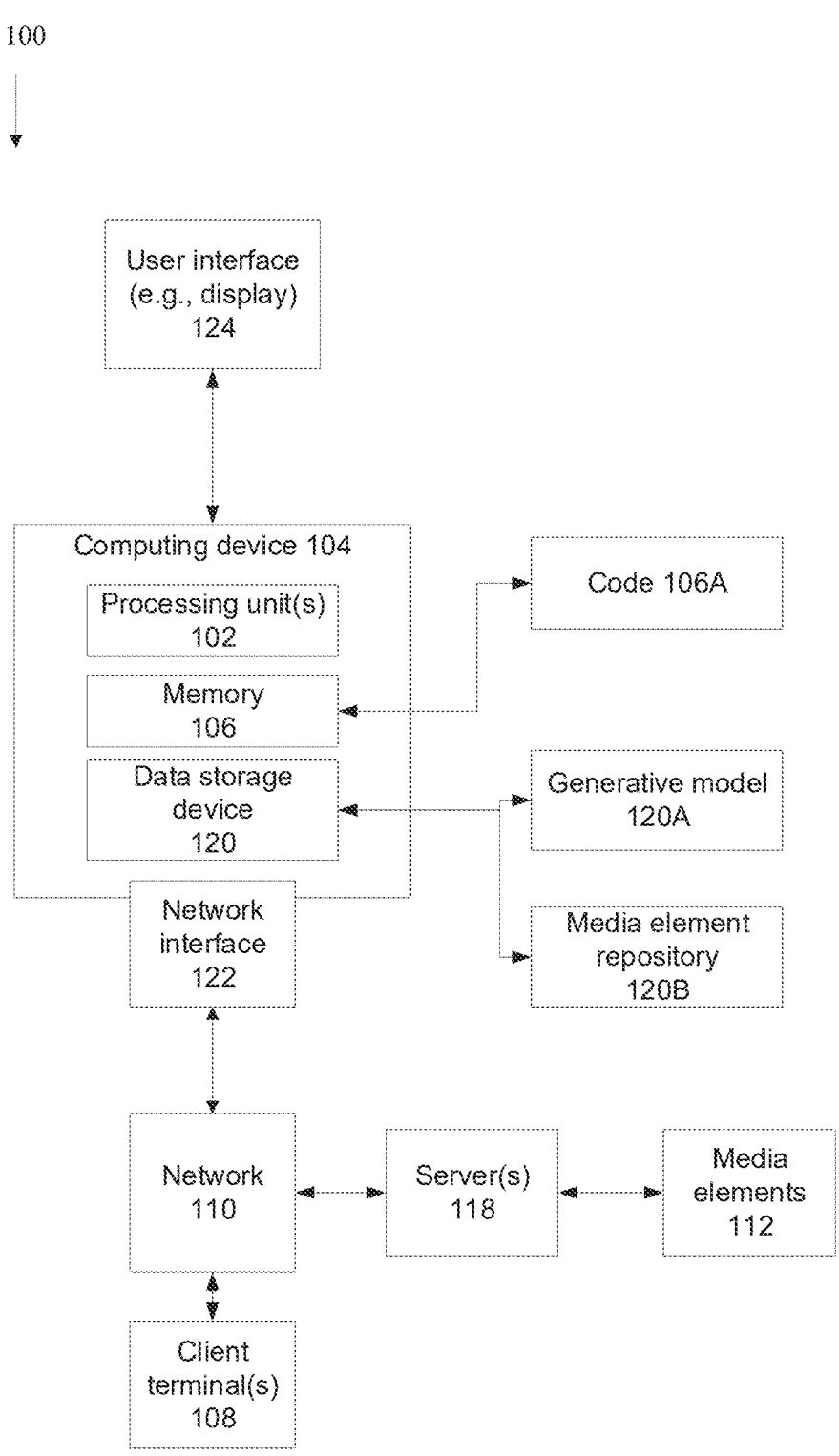
FIG. 1 is a block diagram of components of a system for generating a graphical user interface for presenting estimates for repairing damage to a vehicle according to different severity classification categories, in accordance with some embodiments of the present invention.

The present invention, in some embodiments thereof, relates to graphical user interfaces and, more specifically, but not exclusively, to graphical user interfaces related to damage to a vehicle.

An aspect of some embodiments of the present invention relates to systems, methods, computing devices, and/or code instructions (stored on a data storage device and executable by one or more processors) for generating a graphical user interface (GUI) (also referred to herein as a "presentation") presenting details of repair of damage to a vehicle. A selection of a classification category (also referred to herein as a "classification", a "severity category", or "severity classification category") from multiple classification categories (also referred to herein as "classifications") indicating different levels of severity of damage to the vehicle, is received. For example, mild damage, medium damage, and severe damage. The selection may be made by a user via the GUI, and/or may be automatically made by code. A combination of the classification category and media elements indicating the damage, and optionally an indication of one or more vehicle attributes, is fed into a generative mode. The media elements include, for example, pictures of a part(s) of the vehicle with damage, text descriptions of the damage (e.g., entered by an appraiser and/or mechanic), and the like. Examples of vehicle attributes include manufacturer, model, year of manufacturing, and installed vehicle features such as upgrades. A set of human-readable text elements (also referred to herein as "natural language elements") associated with an estimate (also referred to herein as "indication") for repairing the damage (also referred to herein as "structural reconstitution of the damage") is obtained from the generative model in response to the input. The set is generated according to the inputted classification category. The human-readable text elements include characters and/or numbers, for example, steps in a repair process for repairing the damage, cost per part for repairing the damage, cost of labor for repairing the damage, cost of materials used in the repair process, miscellaneous costs incurred during the repair process, safety considerations, estimated total repair costs, and the like. Numbers (e.g., estimated costs) may be provided as a range. A GUI is generated for presentation on a display. The GUI may depict at least one interactive element for selecting at least the classification category from multiple different classification categories. In response to selection of the classification category by a user interacting with the interactive graphical element of the GUI, the GUI presents the set human-readable text elements and the corresponding estimate for repairing the damage according to the selected classification category.

A user may select a different classification category. The different classification category is fed into the generative model in combination with the media elements and optionally with one or more vehicle attributes, for generating another set of human-readable text element associated with another estimate. The GUI is updated for presenting the set of human-readable text elements. The user may select different classification categories, and the GUI is updated accordingly, optionally in real time.

The GUI may be generated dynamically, in real time (or near real time), in response to selection of respective classification categories by the user. Alternatively, the GUI may be generated in advance, by code iteratively selecting different classification categories for generating different presentations by the GUI. The GUI dynamically adapts the pre-created presentation according to user selection of the classification category.

An aspect of some embodiments of the present invention relates to systems, methods, computing devices, and/or code instructions (stored on a data storage device and executable by one or more processors) for dynamically generating instructional inputs for feeding into a generative model for presenting damage to a vehicle. Images of the vehicle acquired by image sensors positioned at a different heights and/or angles relative to the vehicle are received. A data storage device storing the generative model is accessed. A first instructional input is generated. The first instructional input includes a first a combination of a first classification (e.g., damage category) and the images of the vehicle indicating the damage. The classifications denote increasing levels of severity of damage to the vehicle. The first instructional input is sent, optionally to an input communication element, for input into the generative model, optionally into an input interface associated with the generative model. A first set of natural language elements corresponding to the first classification are obtained from the generative model, for example, from an output interface associated with the generative model. The first set of natural language elements are associated with a first indication for structural reconstitution of the damage corresponding to the first classification. A first state of a presentation of a template with fields, optionally a GUI, is populated with the first set of natural language elements. The presentation (e.g., GUI) includes at least one interactive element for selecting a second classification. The presentation is presented on an endpoint device (e.g., client terminal) accessing a processor (e.g., server), optionally via a network. A selection of a second classification may be detected in real-time. The selection may be made by a user interacting with the interactive element of the presentation. A second instructional input is generated. The second instructional input includes a second combination of the second classification the images of the vehicle. The second instructional input is sent to the input communication element for input into the generative model, optionally via the input interface. A second set of natural language elements corresponding to the second classification, is obtained from the generative model, optionally via the output interface. The second set of natural language elements is associated with a second indication for structural reconstitution of the damage corresponding to the second classification. The first state of the presentation corresponding to the first classification and the second state of the presentation corresponding to the second classification are for the same images of the vehicle of the same damage to the same vehicle. The presentation on the endpoint device is dynamically updated for presenting a second state of the presentation by replacing the fields of the template with the second set of natural language elements.

At least one embodiment described herein addresses the technical problem of generating a GUI presenting a recommendation for repair of damage to a vehicle, taking into account severity of the damage. At least one embodiment described herein improves the technology of GUIs, by generating a GUI presenting a recommendation for repair of damage to a vehicle, taking into account severity of the damage.

The improvement to the GUI provides an enhanced user experience, by improving the user's ability to view different options for repair of a vehicle. Using standard approaches, the user may simply be presented with a single repair option. Different repair options may be presented via different price estimates, each of which may be presented via a different document. The GUI described herein provides a single template with predefined fields, which are dynamically adapted according to a damage severity selected by a user via the GUI, such as by clicking an icon corresponding to the damage severity. The user may toggle between the different values of the same fields of the template of the GUI by clicking on the different icons, which simplifies the user's ability to compare the different options. For example, the user can toggle between minor, moderate and major repairs, and view the changes to the field "Repair Process" to understand the differences. This is in contrast, for example, to the user having to navigate different documents to find different descriptions of the repair process at different locations on the documents, or navigating up and down multiple concatenated pages.

There are different ways to repair damage to a vehicle. The costs of repair may vary significantly. The quality of the repair may vary significantly according to the cost of repair. For example, a vehicle part may be replaced or fixed. When the vehicle part is replaced, the quality of the parts may vary, from previously used parts, to aftermarket parts, to original equipment parts (OEM). In another example, the quality of repair may vary, according to the amount of time required to perform different types of repair, and/or the materials used for repair.

The levels of severity may be, for example, as perceived by a user, indicating the quality and/or effort to put into fixing the repair. For example, on an older car, scratches and/or small dents on a bumper might be perceived as a low severity repair. The user may wish to minimize costs of repair, such as by repairing the existing bumper rather than replacing the bumper, using used aftermarket parts rather than OEM parts, and selecting a cheaper repair process rather than using a more expensive repair process, even at the tradeoff of lower quality for the lower cost. In another example, the same scratches and/or small dents on a new luxury vehicle may be perceived as a high severity repair. The user may wish to obtain the best repair possible, by replacing parts rather than repairing the parts, using OEM parts rather than aftermarket replacements, and a more expensive repair process, in order to minimize the chance that the repair will be visible and/or maximize the quality of the repair.

Training a generative model to output recommended repairs for damage to a vehicle, using different repair approaches for the same type of damage (e.g., from different garages, due to different customer preferences, available of parts, and the like), may "confuse" the generative model, reducing accuracy and/or relevancy of the recommended repairs. For example, for damage to a bumper, it is unclear how the generative model will recommend to perform the repair, since different options may be available. One option (e.g., cheaper such as by fixing existing parts) may not necessarily be more correct than another option (e.g., more expensive such as by replacing parts). The model may erroneously learn other factors which may appear to be correlated with the recommendation of the type of repair, but may have nothing do with the recommended type of repair, but are rather statistical anomalies or coincidences. For example, if white bumpers more commonly replaced than repaired, while red bumpers are commonly repaired than replaced (due to statistical anomaly or coincidence), the generative model may learn such recommendation even if they have nothing to do with selecting the type of repair.

As such, the level of severity, which impacts the type of repair and/or process of repair, is difficult to determine automatically using machine learning models. In particular, since the level of severity may be subjective, being different for different users even for the same vehicle with the same damage, it may be technically difficult to train a generative model to accurately determine the level of severity that is proper for each user, i.e., to customize the level of severity to the user. At least one embodiment described herein addresses the aforementioned technical problem, and/or improves upon the aforementioned technical field, by feeding a combination of a severity level and media elements depicting damage to a vehicle, into a generative model. The severity level may be selected by a user via a GUI, for example, the user selects (e.g., clicks) a box indicating the severity level from multiple different severity levels, such as to dynamically generate the GUI in real time. In another example, the severity level may be automatically selected by code, such as by iteratively selecting each defined severity level to pre-create the GUI in advance of presentation. The generative model may be trained on records of media elements, severity levels, and ground truth of human-readable text elements indicating an estimate for repair of the damage. In response to the input that includes the selected severity level, the generative model outputs human-readable text elements indicating an estimate for repair of the damage, corresponding to the inputted selected severity level. Inputting the selected severity level into the generative model and/or training the generative model on records with indicated severity levels, enables the generative model to generate the correct output corresponding to the inputted severity level.

At least one embodiment described herein relates to an AI-Assisted Vehicle Damage Estimation Interface for accurately assessing and/or adjusting vehicle repair costs. The GUI may facilitate a seamless and/or interactive process, allowing users to dynamically assess and/or adjust repair estimates based on the severity of the damage. The GUI combines AI technology with a user-centric design to offer a powerful tool for professionals and/or consumers to efficiently obtain reliable and/or customizable repair estimates.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
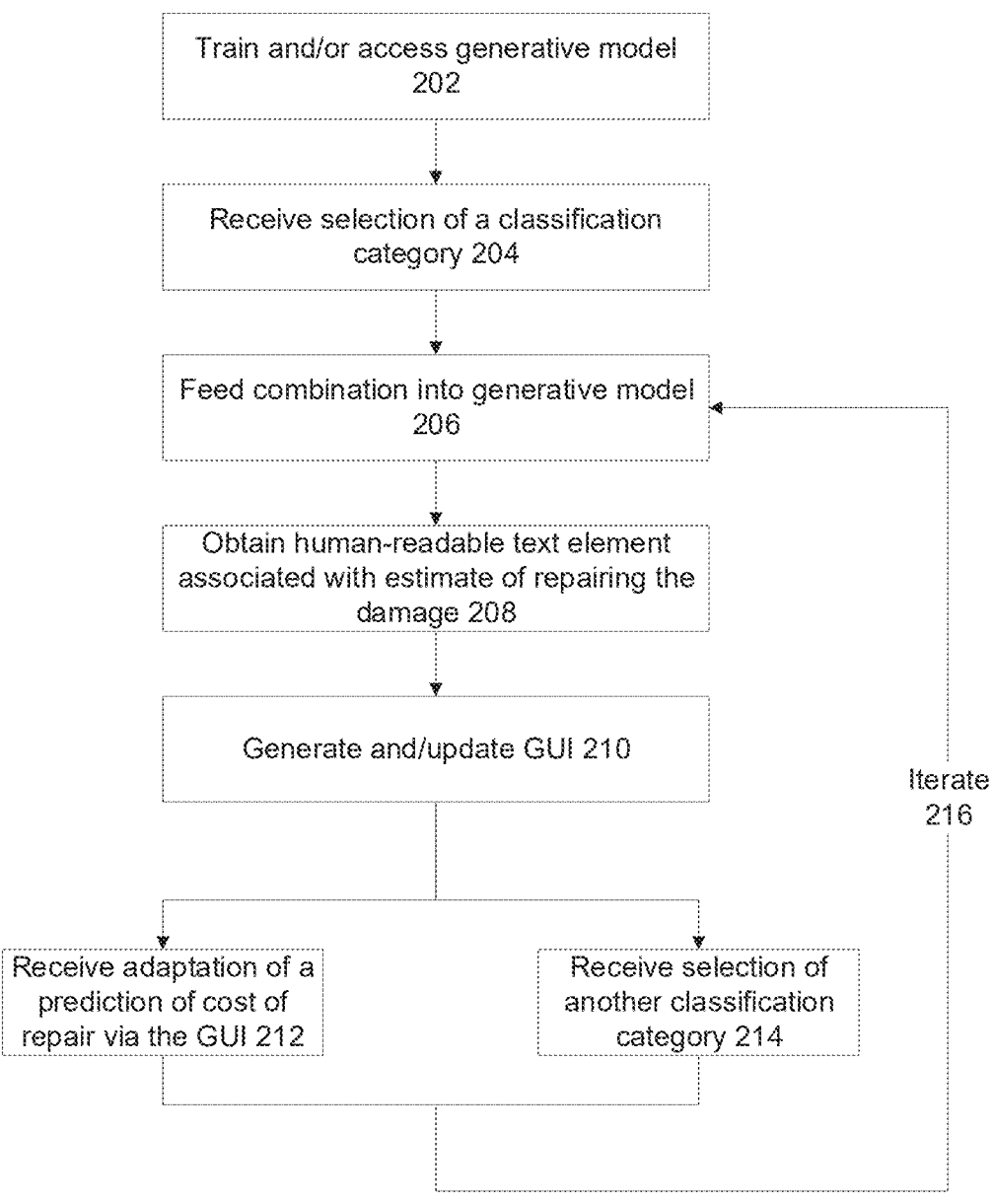
FIG. 2 is a flowchart of a method of generating a graphical user interface for presenting estimates for repairing damage to a vehicle according to different severity classification categories, in accordance with some embodiments of the present invention.
Figure 3A:
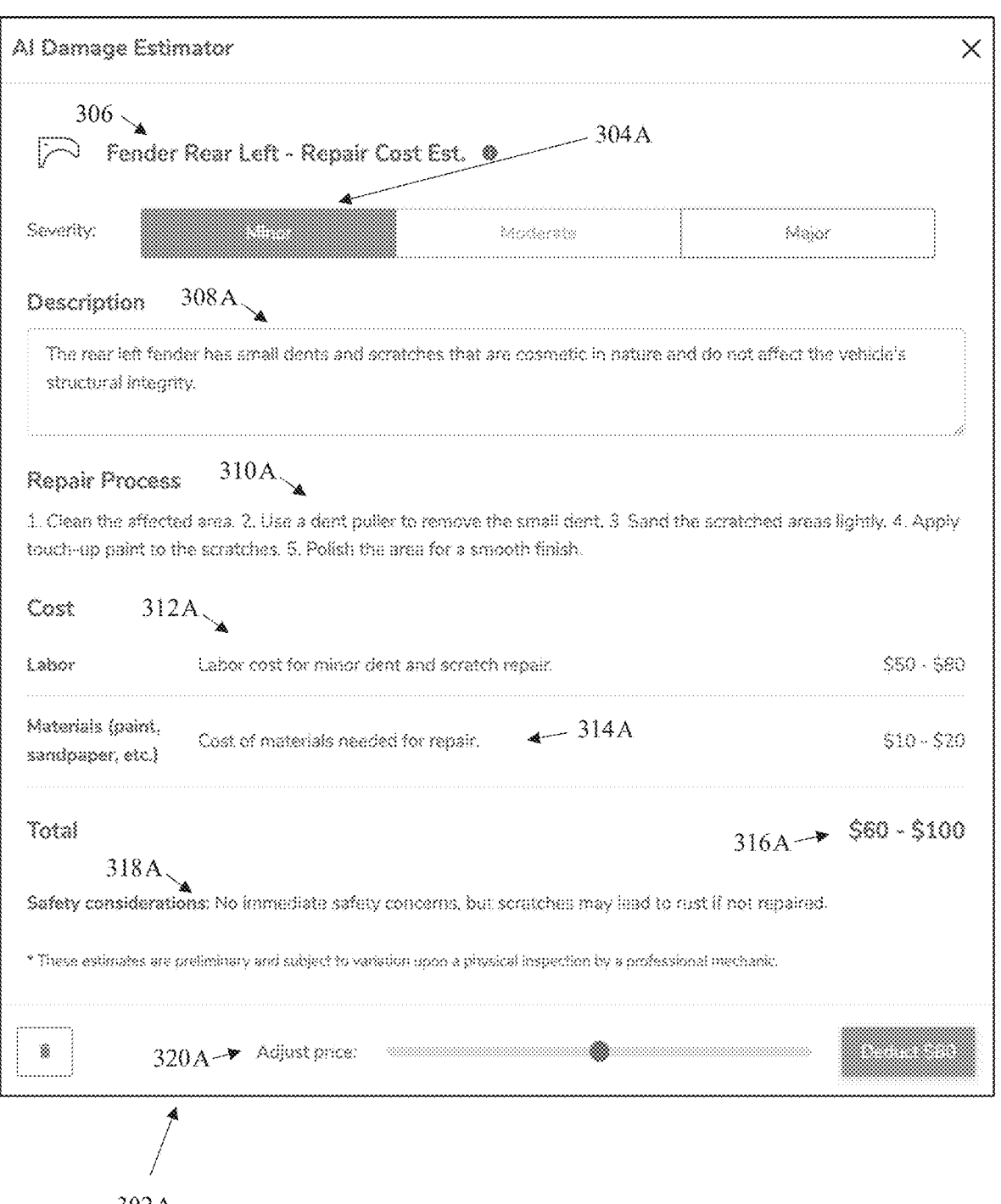
FIGS. 3A-3C depict different states of an exemplary GUI presenting different options for repairing damage to a vehicle according to different severity classification categories, in accordance with some embodiments of the present invention.
Figure 3B:
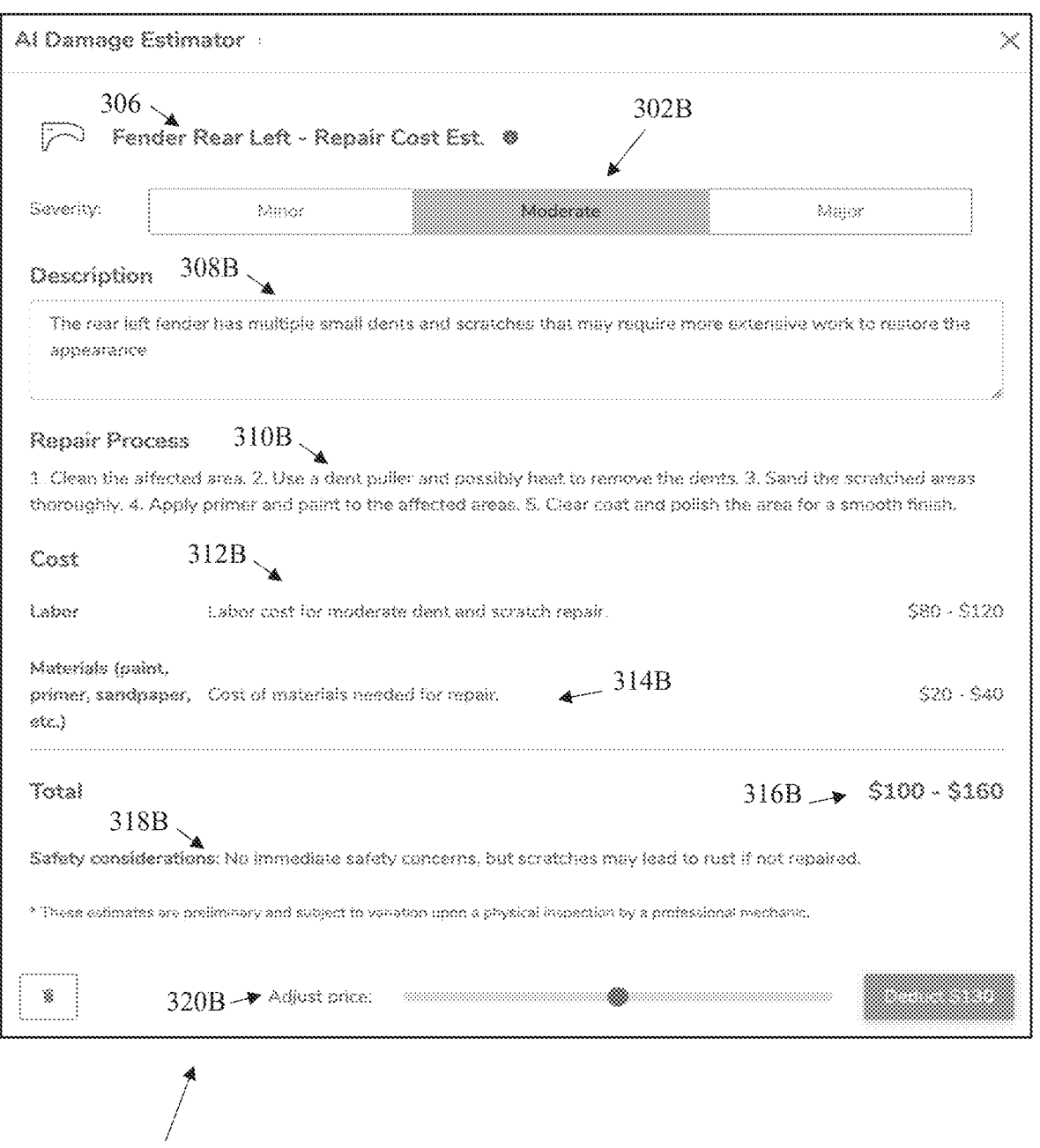
Figure 3C:
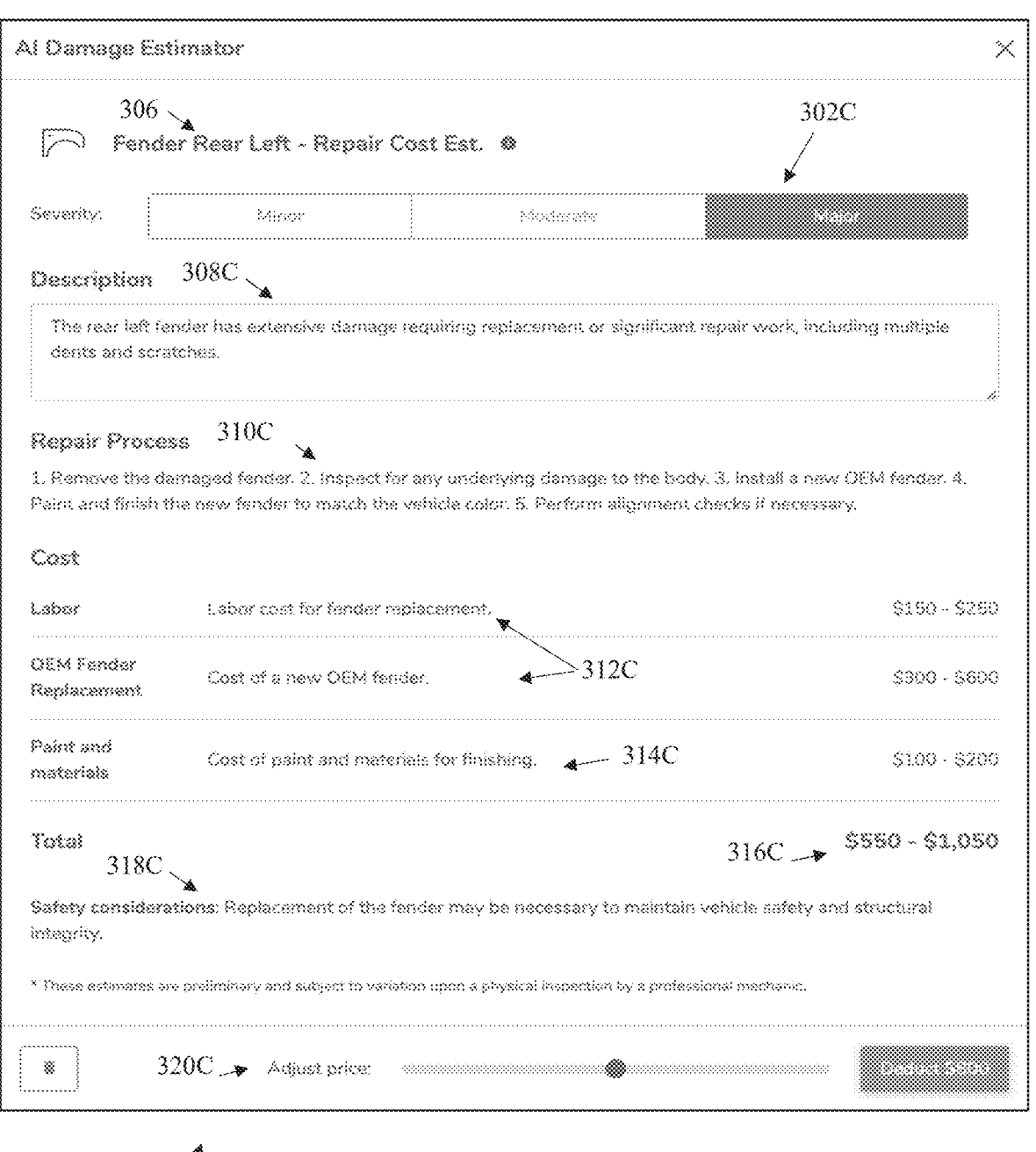

Reference is now made to FIG. 1, which is a block diagram of components of a system 100 for generating a graphical user interface for presenting estimates for repairing damage to a vehicle according to different severity classification categories, in accordance with some embodiments of the present invention. Reference is also made to FIG. 2, which is a flowchart of a method of generating a graphical user interface for presenting estimates for repairing damage to a vehicle according to different severity classification categories, in accordance with some embodiments of the present invention. Reference is also made to FIGS. 3A-3C, depict different states of an exemplary GUI presenting different options for repairing damage to a vehicle according to different severity classification categories, in accordance with some embodiments of the present invention.

Referring now back to FIG. 1, system 100 may implement the features of the method and/or GUI described with reference to FIG. 2, by one or more hardware processors 102 of a computing device 104 executing code instructions stored in a memory (also referred to as a program store) 106.

Computing device 104 may be implemented as, for example, a client terminal, a server, a virtual machine, a virtual server, a computing cloud, a group of interconnected computers, and the like.

Multiple architectures of system 100 based on computing device 104 may be implemented.

In an exemplary centralized implementation, computing device 104 storing code 106A may be implemented as one or more servers (e.g., network server, web server, a computing cloud, a virtual server) that provides services (e.g., one or more of the acts described with reference to FIG. 2) to one or more servers 118 and/or client terminals 108 (also referred to herein as "endpoint devices") over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal(s) 108, and/or providing functions using a remote access session to the servers 118 and/or client terminal(s) 108, such as through a web browser and/or viewing application. Client terminals 108 may be located in different geographical locations, for example, different vehicle dealerships and/or different garages and/or different vehicle inspection centers. For example, client terminals 108 may sent locally captured media elements (e.g., images, text description) of damage to a vehicle to computing device 104. Computing device 104 may generate a GUI presenting estimates for repair of the damage for different classification categories indicating different severity of damage to the vehicle, as described herein. The GUI may be made accessible and/or provided by computing device 104 to respective client terminals 108, for example, for enabling a user to view different estimates for repair at different severity classification levels.

In an exemplary localized implementation, code 106A is locally executed by computing device 104. For example, computing device 104 is installed in a local vehicle service center and/or garage. Media elements may be locally obtained, for example, images of the vehicle are captured by locally installed cameras and/or a text description of the damage is entered by a person working the service center, such as via a user interface. The generated GUI may be presented on a display associated with computing device 104.

Computing device 104 may obtain media elements 112, for example, from server(s) 118 and/or from other sources, such as from data storage devices, and/or directly from sensors such as image sensors. Media elements 112 may be transmitted to computing device 104, for example, via a direct connected (e.g., local bus and/or cable connection and/or short range wireless connection), and/or via a network 110 and a network interface 122 of computing device 104 (e.g., where sensors are connected via a wireless network, internet of things (IoT) technology and/or are located remotely from the computing device).

Media elements 112 may be stored in a media element repository 120B, optionally hosted by a data storage device 120 associated with computing device 104.

Network interface 122 (also referred to herein as a "data communication element") may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may code 106A that execute one or more acts of the method described with reference to FIG. 2.

Computing device 104 may include data storage device 120 for storing data, for example, generative model 120A for generating the human-readable text elements which are presented within the GUI, and/or media element repository 120B. Data storage device 120 may be implemented as, for example, a memory, a local hard-drive, a removable storage unit, an optical disk, a storage device, a virtual memory and/or as a remote server 118 and/or computing cloud (e.g., accessed over network 110).

Computing device 104 and/or client terminal(s) 108 include and/or are in communication with one or more physical user interfaces 124 that include a mechanism for inputting data and/or for viewing data, for example, a display for presenting the GUI. Exemplary user interfaces 124 include, for example, one or more of, a touchscreen, a display, a keyboard, a mouse, and voice activated software using speakers and microphone.

At 202, a generative model is trained and/or accessed.

The generative model may be implemented, for example, as a large language model (LLM), for example, a neural network. The generative model may be designed to output human-readable text elements indicating an estimate of repair damage to a car, in response to an input. The input may be a combination of a severity classification category and multiple media elements. Alternatively or additionally, the input may include a selected total cost entered by a user via an existing GUI presenting human-readable text elements generated by the generative model. Inputting the selected total cost may adapt the human-readable text elements of the existing GUI, i.e., while complying with the current severity level. For example, a more specific selection of labor and/or parts that add up to the selected total cost.

The generative model may be trained on a training dataset of records. A record may be for a sample vehicle with sample damage, which has been repaired, for which details of the repair are known. The record may include:

A certain classification category from multiple defined severity categories. For example, mild, moderate, severe, or other categories. There may be a different number of categories, for example, two, three, four, or more.

Multiple media elements for the sample vehicle indicating the sample damage.

Human-readable text elements obtained after the damage has been repaired, which may include a total cost for performing the repair. In generative models trained using a supervised approach, the human-readable text elements may serve as a ground truth.

Examples of human-readable text elements include: steps in the repair process, replacement parts, cost per part, purpose of labor, cost of labor, materials used, cost of materials, miscellaneous other details, miscellaneous costs, safety considerations, and total cost of repair.

Vehicle attributes of the sample vehicle, for example, manufacturer, model, year of manufacturing, and installed vehicle features such as upgrades Examples of media elements indicating the damage include:

Images of a region of the vehicle including the damage captured (also referred to herein as "acquired") by one or more cameras, Individual images, sequences of images, and/or videos, may be obtained from one or more image sensors (e.g., cameras) arranged at different views, optionally with at least some overlap, for capturing images of different parts of the surface of the vehicle. The image sensors may be, for example, cameras, standard visible light sensors (e.g., CCD, CMOS sensors, and/or red green blue (RGB) sensor). Computing device 104 may receive sequences of time-spaced images captured by multiple image sensors positioned in different views, for example cameras.

Sensors data collected by sensors within the vehicle, for example, indicating malfunctioning parts, activation of airbags, and the like.

A human-readable text description of the damage (e.g., appraiser report, description by a mechanic). The text description of the damage may assist the generative model in determining what is the relevant damage and what isn't. For example, in a case where an older vehicle was involved in an accident, the repair may be to components/parts of the vehicle that were damaged in the accident, excluding existing damage to other components of the vehicle that were pre-existing and not involved in the accident. For example, in a side impact accident, the damage may be to the door of the vehicle, but not to the bumper. The bumper may have pre-existing scratches and/or small dents due to cumulative wear and tear over years. The repair estimate is to be generate for the door not for the bumper.

Text description of an accident that led to the damage to the vehicle, for example, police report, insurance report, driver report, and the like.

An indication of a total loss, for example, to generate alert that the vehicle should not be repaired but deemed a total loss. A threshold, such as an absolute value and/or percentage may be defined indicting when the vehicle is to be classified as a total loss. For example, when the estimated cost of repair is above the threshold, such as above 75% of the value of the vehicle prior to damage.

One or more databases, for example, available parts and their costs, government regulations providing guidelines for repairs. The databases may be updated from time to time. The most updated version should be used. The database may be searched, for example, by a search process, with the returned values fed into the generative model (rather than feeding the enter database into the generative model).

Exemplary architectures of the generative model may include, for example, one or more of: a large language model (LLM), a detector architecture, a classifier architecture, and/or a pipeline combination of detector(s) and/or classifier (s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

At 204, a classification category selected from the multiple pre-defined severity categories indicating different levels of severity of damage to the vehicle, is received.

The classification category may be received according to the implementation of generation of the GUI.

In an implementation in which the GUI is dynamically generated in real-time (or near real time) in response to a user selected classification category entered via the GUI, the classification category may be selected by the user via the GUI. For example, the user clicks on an icon of the desired classification category, or slides a slider to the desired classification category (e.g., on a range of increasing severity).

In an implementation in which the GUI is pre-generated, the classification category may be automatically set by code. For example, code may iteratively select each defined severity category for creating offline the multiple states of the GUI to be made available for presentation to a user in response to the user selecting the classification category via the GUI.

At 206, a combination of the selected classification category and multiple media elements indicating the damage of a target vehicle is fed into the generative model.

The media elements relate to damage of the target vehicle. For example, images of a region of the target vehicle including the damage captured (also referred to herein as "acquired") by one or more cameras, human-readable text description of the damage, and the like. The type of media elements depicting the target vehicle that may be fed into the generative model may correspond to the type of media elements used in the records for training the generative model.

Optionally, the combination fed into the generative model includes an indication of one or more vehicle attributes, for example, manufacturer, model, year of manufacturing, color, type of finish, and installed vehicle features such as upgrades.

At 208, a set of human-readable text elements associated with an estimate for repairing the damage is obtained from the generative model. The set of human-readable text elements correspond to the selected classification category which was fed into the generative model.

The human-readable text elements may correspond to predefined fields of a template. Examples of fields to which the human-readable text elements are generated for include: steps in the repair process, replacement parts, cost per part, purpose of labor, cost of labor, materials used, cost of materials, miscellaneous other details, miscellaneous costs, safety considerations, and total cost of repair. The type of human-readable text elements depicting the target vehicle that may be fed into the generative model may correspond to the type of human-readable text elements used in the records for training the generative model.

The human-readable text elements generated by the generative model may include ranges of values representing a breakdown of a total estimated cost for repair of the damage, corresponding to the selected severity level.

The human-readable text elements may include the total estimated cost for repair of the damage, which may be determined as a sum of the breakdown of the estimated cost, for example, by adding up the different predicted individual components that will need to be repaired or replaced, estimated cost of labor, and/or estimated miscellaneous other costs. The total estimated cost may be computed as a range, optionally cover the lowest total estimated cost to the highest estimated total cost.

At 210, the GUI is generated for presentation on a display.

The GUI may be generated based on a predefined template with multiple predefined fields. The fields are populated accordingly with the generated human-readable text elements. The template enables rapid updating of the GUI while minimizing visual impact on the user, by replacing the values of the predefined fields of the template with new human-readable text elements generated by the generative model for a different selected damage category.

The generated GUI presents one or more of:

The classification categories, where the currently selected classification category is indicated, such as by being visually distinct, for example, color coded, bolded, and the like. The classification categories are presented in associate with one or more interactive graphical elements designed to enable a user to select a different classification category, for example, buttons and/or a slider, and the like.

The human-readable text elements corresponding to the selected classification category, generated by the generative model. The human-readable text elements may be presented within a template of the GUI.

An adaptable graphical element indicating an estimated cost for repairing the damage, for example a slider.

At 212, an adaptation of the adaptable graphical element indicating the estimated cost for repairing the damage is received via the GUI. For example, the user moves the slider to the desired estimated total cost.

The adaptation may be for narrowing down the range presented by the GUI, for example, from an estimate of $500-1100, the user narrows down the range to $700-$800. Alternatively or additionally, the adaptation may be for selecting a specific value, for example, from the estimate of $500-1100 the user selects a value of $750. The value or range representing the estimated cost for repairing the damage obtained in response to the adaptation, of the adaptable graphical element within the GUI (i.e., by a user), is obtained.

The value and/or range selected by the adaptation of the adaptable graphical element may be fed into the generative model. The value and/or range may be fed into the generative model as part of a prompt (also referred to herein as "instructional input") instructing the generative model to update the human-readable text elements to comply with the selected value and/or range of the total cost. Alternatively or additionally, the value and/or range may be fed into the generative model as part of the combination of the media elements and severity classification category, for example, as part of a prompt instructing the generative model to generate human-readable text elements according to the media elements and severity classification category that total to the selected value and/or range.

The updated human-readable text elements are obtained from the generative model. The updated human-readable text elements may represents a narrower version of the preceding human-readable text elements. The GUI is updated, for presenting the updated human-readable text elements. In response to feeding the value and/or range represented by the adaptation of the adaptable graphical element, one or more of the following human-readable text elements are adapted:

At least one material used for repairing the damage. For example, when a part is to be replaced, and the estimated cost is $100-200 depending on whether the part is an OEM part or a aftermarket part, the estimated cost is narrowed to either the cost of the OEM part (e.g., $185) or the cost of the aftermarket part (e.g., $107) for complying with the value and/or range selected via the adaptable graphical element.

At least one step in a repair process for repairing the damage. For example, a not necessary repair step which may be done to improve cosmetic appearance is included when a higher value or range is selected, and excluded when a lower value or range is selected, for complying with the selected value or range.

Labor for repairing the damage.

Projected quality of the repair of the damage.

At 214, a selection of another classification category from the multiple defined severity categories, is selected. The other classification category is different from the current classification category. For example, switching from a low severity category to a moderate severity category, or switching from a severe category to a low severity category, and the like.

The selection of the other classification category triggers a change in the state of the GUI, from human-readable text elements corresponding to the preceding classification category, to human-readable text elements corresponding to the currently selected classification category.

Optionally, the change in state of the GUI is performed by dynamically generated the human-readable text elements in real time, and dynamically updating the GUI for presenting the dynamically generated human-readable text elements. The dynamically generated human-readable text elements may be generated by feeding into the generative model, the combination of the currently selected classification category and the media elements indicating the damage, which may be the same media elements fed into the generative model with the preceding classification category. Another set of the human-readable text elements is obtained, including another estimate cost for repairing the damage according to the currently selected classification category. The current set of human-readable text elements may be different from the preceding set of human-readable text elements. The GUI is updated for presenting the current set of human-readable text elements including the current estimated cost of repairing the damage.

Optionally, in response to selection of another classification category, the data fed into the generative model may include the preceding human-readable text element corresponding to the preceding classification category (generated from the preceding feed) optionally including the preceding classification category. Feeding the preceding human-readable text elements corresponding to the preceding classification category and optionally the preceding classification category may assist the generative model in generating a more accurate set of human-readable text elements for the current classification category—the generative model may better determine how to generate the current set of human-readable text elements for the current classification category in view of the previously generated set of human-readable text elements for the preceding classification category. Optionally, all preceding generated sets of human-readable text elements and/or the preceding classification categories are fed into the generated model for generating the current set of human-readable text elements. For example, after generating human-readable text elements for the mild and severe damage categories, the generative model may more accurately generate human-readable text elements for the moderate damage category given the human-readable text elements generated for the mild and severe, for example, approximately in the middle between the mild human-readable text elements and the severe human-readable text elements.

A prompt for feeding into to the generative model may be automatically generated, for example, using a predefined template and/or another LLM and the like. The prompt instructs the generative model to generate the other set of human-readable text elements corresponding to the currently selected classification category given that the preceding set that was previously generated for the preceding classification category. An example of a prompt: "Generate the description for the mild severity category given that the description for the major category is "The rear fender has extensive damage requiring replacement or significant repair work, including multiple dents and scratches", and the description for the moderate category is "The rear fender has multiple small dents and scratches that may require more extensive work to restore the appearance.", based on the following media elements [media elements inserted here]." In another example, "Generate the total price estimate for the moderate severity category given that the total price estimate for the mild severity category was $60-100 and for the major severity category was $550-$1050, based on the following media elements [media elements inserted here]."

It is noted that in some implementations, such as where the generative model stores a history of its interactions, the previously fed media elements and/or previously generated human-readable text elements may not require being explicitly re-fed into the generative model. For example, "Generate the human-readable text elements for a moderate category given the media elements previously provided for the mild category and in view of the previously generated human-readable text elements you generated for the mild category."

At 216, one or more features described with reference to 206-214 may be iterated.

The iterations may be performed, for example:

For dynamically updating the state of the GUI in response to a user selection of a different severity category. The state of the GUI may be dynamically generated in real time (or near real time), such as by feeding the combination of the different severity category and the media elements into the generative model, to obtain another set of human-readable text elements corresponding to the different severity category.

For generating the GUI in advance of viewing by a user, by iterating the selection of each respective severity category to generate all the states of the GUI. In implementation in which preceding human-readable text elements and/or preceding severity categories are fed into the generative model for generating the current set of human-readable text elements (e.g., as described herein), the order of feeding may be selected to obtain higher accuracy. For example, the order might be in increasing severity, such as from mild, to moderate to severe, where in each feeding the human-readable text elements of the preceding severity For updating the human-readable text elements in response to adaptation of the cost estimate (e.g., by the user adjusting the slider).

Referring now back to FIGS. 3A-3C, GUI state 302A of FIG. 3A depicts a severity category of minor 304A. GUI state 302B of FIG. 3B depicts a severity category of moderate 304A. GUI state 302C of FIG. 3C depicts a severity category of major 304C. The GUI may include a window featuring a clear, segmented layout designed to guide users through the damage estimation process. The GUI may include several key sections, each dedicated to specific aspects of the estimation. This GUI may be implemented within a modal.

The GUI may integrates AI processes that calculate repair costs in real-time as users interact with the severity slider and/or price adjustment tool. These AI-driven calculations may ensure that the estimates are accurate, reflecting the most up-to-date industry standards and repair methodologies.

The GUI may be designed with user experience in mind, to be intuitive and/or accessible, for example, featuring clear navigation, interactive elements, and/or easily digestible information. The GUI may allow users to finalize the estimate with a single action, such as saving and/or applying the deduction, for streamlining the decision-making process.

The damage severity may be selected via an interactive graphical element 330, which may present the available severity levels, for example, minor, moderate, major, or other categories and/or greater or fewer number of categories. Interactive graphical element 330 may be implemented as, for example, a slider, buttons, and the like, optionally color coded. The GUI state is dynamically updated to present the repair process, cost estimate, and other details, corresponding to the selected severity level.

The different severity categories are for the same damage, described as "Fender Rear Left" 306.

Human readable text elements indicating estimates for repair of the damage are generated by a generative model in response to an input of the selected severity category and media elements, as described herein. Different values are generated for the same damage, according to the selected severity level. For example:

Description of the damage 308A-C: May be located below the severity selection graphical element 330. May be implemented as a text box providing a detailed description of the damage, which is adapted according to the selected severity level. The description may provide context and/or clarity about the nature and/or impact of the damage. Following the description, the GUI may presents a detailed breakdown of the repair process and/or associated costs.

Description of the repair process 310A-C. Text describing a step-by-step procedure for addressing the damage, including actions, for example, dent removal, sanding, painting, and/or reinstallation of parts. The steps are tailored to the severity of the damage, which may help ensure that the user is fully informed about the necessary repairs.

Cost breakdown, which may be divided into categories, for example, cost of labor 312A-C, cost of materials 314A-C, and/or additional specific costs such as part removal and reinstallation 312C. The categories of the cost breakdown include a text description of the labor to be performed, specific materials, and/or additional specific costs, including a cost estimate for each category. The cost estimate may be presented as a range of estimated cost.

Total estimated cost 316A-C. A sum of the cost estimates of multiple categories listed under the cost breakdown. The total estimated cost may be presented as a range of estimated cost.

Safety considerations 318A-C. May be presented adjacent to the cost breakdown, or in another location. A dedicated safety considerations section may present text for alerting users to any potential risks associated with the damage if not repaired. This information varies according to the severity selected and/or may provide critical insights into the potential impact on vehicle safety and performance.

The GUI presents an interactive adjustable slider 320 (or other implementation of an adjustable graphical element) is designed to enable a user to adjust the estimated cost. The interactive adjustable slider 320 may be located, for example, at the bottom of the GUI, or other locations. The interactive adjustable slider 320 may be designed to allow users to fine-tune the final repair estimate within a specified range, reflecting variances in labor rates, material costs, and/or other factors. The interactive adjustable slider 320 offers a real-time adjustment mechanism, which may empower users to customize the cost estimate according to their specific needs or preferences.

The GUI is updated according to the adjusted cost by the user, as described herein. For example, more specific labor and/or more specific materials are selected according to the adjusted cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for dynamically generating instructional inputs for feeding into a generative model for presenting damage to a vehicle, comprising: a plurality of image sensors positioned at a plurality of different heights and/or angles relative to the vehicle configured for acquiring a plurality of images of the vehicle; a data communication element configured to receive the plurality of images of the vehicle and to access a data storage device storing the generative model; at least one processor in communication with data communication element and with at least one endpoint device over a network, the at least one processor configured for executing a code for: generating a first instructional input including first a combination of a first classification of a plurality of classifications and the plurality of images of the vehicle indicating the damage, wherein the plurality of classifications denote increasing levels of severity of damage to the vehicle; sending the first instructional input to an input communication element for input into the generative model; obtaining from the generative model, a first set of a plurality of natural language elements corresponding to the first classification, the first set of natural language elements associated with a first indication for structural reconstitution of the damage corresponding to the first classification; generating a first state of a presentation of a template with a plurality of fields populated with the first set of natural language elements and including at least one interactive element for selecting a second classification of the plurality of classifications, presenting the presentation on an endpoint device accessing the at least one processor; and in real-time, detecting a selection of a second classification of the plurality of classifications made by a user interacting with the at least one interactive element of the presentation; generating a second instructional input including a second combination of the second classification of the plurality of classifications and the plurality of images of the vehicle; sending the second instructional input to the input communication element for input into the generative model; obtaining from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle; and dynamically updating the presentation on the endpoint device for presenting the second state of the presentation by replacing the plurality of fields of the template with the second set of natural language elements.

2. The system of claim 1, further comprising code for:

in real-time, detecting a selection of a third classification of the plurality of classifications made by a user interacting with the at least one interactive element of the presentation;

generating a third instructional input including a third combination of the third classification of the plurality of classifications and the plurality of images of the vehicle;

sending the third instructional input to the input communication element for input into the generative model;

obtaining from the generative model, a third set of a plurality of natural language elements corresponding to the third classification, the third set of natural language elements associated with a third indication for structural reconstitution of the damage corresponding to the third classification, wherein the first state of the presentation corresponding to the first classification and a third state of the presentation corresponding to the third classification are for the same plurality of images of the vehicle of the same damage to the same vehicle; and dynamically updating the presentation on the endpoint device for presenting the third state of the presentation by replacing the plurality of fields of the template with the third set of natural language elements.

3. The system of claim 1, wherein the natural language elements comprise human-readable text.

4. The system of claim 1, wherein the presentation comprises a graphical user interface (GUI), wherein the at least one interactive elements comprises at least one interactive graphical element.

5. The system of claim 1, further comprising code for accessing a text description of the damage, wherein the text description is included in the first combination used to generate the first instructional input and the second combination used to generate the second instructional input.

6. The system of claim 1, wherein the generative model is trained on a plurality of records, wherein a record is for a sample vehicle with sample damage which has been repaired, the record includes a certain classification from the plurality of classifications, the plurality of images for the sample vehicle depict the sample damage, and a ground truth including the set of the plurality of natural language elements obtained after the damage has been repaired and a total cost for performing the repair.

7. The system of claim 1, wherein the generative model generates a range indicating an estimated cost for structural reconstitution of the damage corresponding to a respective classification, the range corresponding to the set of the plurality of natural language elements corresponding to the respective classification, and wherein the presentation comprises a GUI.

8. The system of claim 7, further comprising code for:

in response to interaction of a user with an interactive element of the GUI indicating a value within the range of the estimate cost for structural reconstitution of the damage, feeding into the generative model an instructional input indicating the value within the range and a request to update the set of the plurality of natural language elements of the presented GUI state to comply with the value;

obtaining an update of the set; and updating the GUI for presenting the update of the set.

9. The system of claim 7, further comprising code for:

in response to interaction of a user with an interactive graphical element of the GUI indicating a value within the range of the estimate cost for repairing the damage, generating an adapted at least one natural text element by adapting at least one of the following natural language elements of the set of the state of the GUI presented on the display:

(i) at least one material used for structural reconstitution of the damage, (ii) at least one step in a repair process for structural reconstitution of the damage, (iii) labor for structural reconstitution of the damage, (iv) projected quality of the structural reconstitution of the damage, wherein an adapted set including the adapted at least one natural language text element complies with the value within the range, wherein the GUI is updated for presenting the adapted at least one natural language element.

10. The system of claim 1, wherein the GUI further includes an adaptable interactive graphical element indicating an estimated cost for structural reconstitution of the damage, and further comprising: automatically adapting the interactive graphical element for indicating an estimate for structural reconstitution of the damage generated by the generative model.

11. The system of claim 1, further comprising code for:

receiving via the GUI, a value or range representing an estimated cost for structural reconstitution of the damage, the value or range obtained in response to a user interacting with an interactive graphical element presented within the GUI, feeding an instructional input into the generative model indicating the value or range, wherein the set obtained from the generative model corresponds to the value or range, wherein the estimated cost for structural reconstitution of the damage presented within the GUI includes the value or range.

12. The system of claim 1, wherein the plurality of natural language elements include a plurality of ranges for a plurality of values representing a breakdown of an estimate for structural reconstitution of the damage, and at least one of: the estimate is computed according to the plurality of range, and a range of the estimate is narrowed in response to selection of a specific value within a range.

13. The system of claim 1, wherein the plurality of fields in the template which are populated by natural language elements are selected from: steps in a repair process, cost per part, cost of labor, cost of materials, miscellaneous costs, safety considerations.

14. The system of claim 1, wherein at least the first instructional input fed into the generative model includes at least one vehicle attribute, wherein a record of a sample vehicle used to train the generative model includes at least one vehicle attribute of the sample vehicle.

15. The system of claim 14, wherein the at least one vehicle attribute is selected from manufacturer, model, year of manufacturing, installed vehicle features, and upgrades.

16. A computer implemented method of dynamically generating instructional inputs for feeding into a generative model for presenting damage to a vehicle, comprising:

using at least one processor executing a code for:

receiving a plurality of images of the vehicle acquired by a plurality of image sensors positioned at a plurality of different heights and/or angles relative to the vehicle;

accessing a data storage device storing the generative model;

generating a first instructional input including first a combination of a first classification of a plurality of classifications and the plurality of images of the vehicle indicating the damage, wherein the plurality of classifications denote increasing levels of severity of damage to the vehicle;

sending the first instructional input to an input communication element for input into the generative model;

obtaining from the generative model, a first set of a plurality of natural language elements corresponding to the first classification, the first set of natural language elements associated with a first indication for structural reconstitution of the damage corresponding to the first classification;

generating a first state of a presentation of a template with a plurality of fields populated with the first set of natural language elements and including at least one interactive element for selecting a second classification of the plurality of classifications, presenting the presentation on an endpoint device accessing the at least one processor; and in real-time, detecting a selection of a second classification of the plurality of classifications made by a user interacting with the at least one interactive element of the presentation;

generating a second instructional input including a second combination of the second classification of the plurality of classifications and the plurality of images of the vehicle;

sending the second instructional input to the input communication element for input into the generative model;

obtaining from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle; and dynamically updating the presentation on the endpoint device for presenting the second state of the presentation by replacing the plurality of fields of the template with the second set of natural language elements.

17. A non-transitory medium storing program instructions for dynamically generating instructional inputs for feeding into a generative model for presenting damage to a vehicle, which when executed by at least one processor, cause the at least one processor to:

receive a plurality of images of the vehicle acquired by a plurality of image sensors positioned at a plurality of different heights and/or angles relative to the vehicle;

access a data storage device storing the generative model;

generate a first instructional input including first a combination of a first classification of a plurality of classifications and the plurality of images of the vehicle indicating the damage, wherein the plurality of classifications denote increasing levels of severity of damage to the vehicle;

send the first instructional input to an input communication element for input into the generative model;

obtain from the generative model, a first set of a plurality of natural language elements corresponding to the first classification, the first set of natural language elements associated with a first indication for structural reconstitution of the damage corresponding to the first classification;

generate a first state of a presentation of a template with a plurality of fields populated with the first set of natural language elements and including at least one interactive element for selecting a second classification of the plurality of classifications, present the presentation on an endpoint device accessing the at least one processor; and in real-time, detect a selection of a second classification of the plurality of classifications made by a user interacting with the at least one interactive element of the presentation;

generate a second instructional input including a second combination of the second classification of the plurality of classifications and the plurality of images of the vehicle;

send the second instructional input to the input communication element for input into the generative model;

obtain from the generative model, a second set of a plurality of natural language elements corresponding to the second classification, the second set of natural language elements associated with a second indication for structural reconstitution of the damage corresponding to the second classification, wherein the first state of the presentation corresponding to the first classification and a second state of the presentation corresponding to the second classification are for the same plurality of images of the vehicle of the same damage to the same vehicle; and dynamically update the presentation on the endpoint device for presenting the second state of the presentation by replacing the plurality of fields of the template with the second set of natural language elements.

* * * * *